(12) United States Patent
Koifman et al.

(10) Patent No.: US 9,571,774 B2
(45) Date of Patent: Feb. 14, 2017

(54) CURRENT MODE PIXEL AND READOUT CIRCUIT HAVING A FIRST AND A SECOND READOUT PHASE

(71) Applicants: Vladimir Koifman, Rishon Lezion (IL); Tiberiu Galambos, Binyamina (IL)

(72) Inventors: Vladimir Koifman, Rishon Lezion (IL); Tiberiu Galambos, Binyamina (IL)

(73) Assignee: ANALOG VALUE LTD., Rishon Lezion (IL)

( * ) Notice: Subject to any disclaimer, the term of this patent is extended or adjusted under 35 U.S.C. 154(b) by 42 days.

(21) Appl. No.: 14/849,805

(22) Filed: Sep. 10, 2015

(65) Prior Publication Data

US 2016/0240572 A1 Aug. 18, 2016

Related U.S. Application Data

(60) Provisional application No. 62/115,337, filed on Feb. 12, 2015.

(51) Int. Cl.
*H04N 5/378* (2011.01)

(52) U.S. Cl.
CPC .................... *H04N 5/378* (2013.01)

(58) Field of Classification Search
CPC ........ H04N 5/378; H04N 5/3745; H04N 3/14; G06F 3/0412; H01L 27/146

USPC .......................................... 250/214 R, 208.1
See application file for complete search history.

(56) References Cited

U.S. PATENT DOCUMENTS 7,847,846 B1 * 12/2010 Ignjatovic ............ H04N 5/3745
250/208.1

* cited by examiner

*Primary Examiner* — Que T Le
(74) *Attorney, Agent, or Firm* — Reches Patents

(57) ABSTRACT

A device comprising a pixel, a current source, and a readout circuit; wherein during a first readout phase of the pixel, the readout circuit is configured to sample a sampled output voltage of an output node of the pixel; and wherein an output current of the pixel is set by the current source; wherein between the first readout phase of the pixel and a second readout phase of the pixel, the pixel is configured to change the output current to provide a second output current, wherein the change of the output current is responsive to radiation sensed by a radiation sensor of the pixel during a sensing period; wherein during the second readout phase of the pixel the readout circuit is configured to sample the second output current while providing the sampled output voltage to the output node of the pixel; wherein during the first readout phase of the pixel and the second readout phase of the pixel a drain source voltage of an output transistor of the pixel is maintained constant; and wherein the output transistor is configured to generate the second output current.

18 Claims, 8 Drawing Sheets

CURRENT MODE PIXEL AND READOUT CIRCUIT HAVING A FIRST AND A SECOND READOUT PHASE

BACKGROUND

Pixels are used to sense incoming radiation. Non-limiting examples of such pixels include infrared pixels, visible light pixels and various other radiation sensitive pixels.

Some pixels operate in a current mode while some other pixels operate in a voltage mode. A pixel that operates in current mode outputs an output current while a pixel that operates in voltage mode outputs an output voltage.

Pixels that operate in current mode have higher photoresponse variations than pixels that operate in voltage mode—due to local variations of their output device transconductance. Due to these variations, most analog pixels operate at voltage mode although voltage mode is much slower than current mode.

SUMMARY

According to an embodiment of the invention there may be provided a device that may include a pixel, a current source, and a readout circuit; during a first readout phase of the pixel, the readout circuit may be configured to sample a sampled output voltage of an output node of the pixel; and wherein an output current of the pixel is set by the current source; between the first readout phase of the pixel and a second readout phase of the pixel, the pixel may be configured to change the output current to provide a second output current, wherein the change of the output current is responsive to radiation sensed by a radiation sensor of the pixel during a sensing period; during the second readout phase of the pixel the readout circuit may be configured to sample the second output current while providing the sampled output voltage to the output node of the pixel; during the first readout phase of the pixel and the second readout phase of the pixel a drain source voltage of an output transistor of the pixel is maintained constant; and wherein the output transistor may be configured to generate the second output current.

The readout circuit may include a sample and buffer circuit and a current memory; wherein during the first readout phase the current memory is disconnected from the sample and buffer circuit and from the pixel.

During the second readout phase the current memory may be configured to provide to the output node of the pixel a feedback current that equals a difference between the second output current and a fixed current drained from the output node of the pixel by the current source.

The current memory may include a sampling unit and an output transistor; wherein the sampling component may be configured to sample, during the second readout phase, a sampled gate voltage of the output transistor; wherein the feedback current is provided to the output node of the pixel via a feedback loop; and wherein the sampling unit may be configured to provide to the gate of the output transistor the sampled gate voltage after the current memory is disconnected from the pixel.

The current memory may include a current memory input switch, a feedback switch and a current memory output switch; wherein during the first readout phase the current memory input switch and the current memory output switch are closed and the feedback switch is open; wherein during the second readout phase the current memory input switch and the current memory output switch are open and the feedback switch is closed.

The sample and buffer circuit may include a first switch, an operational amplifier and a capacitor; wherein the capacitor may be coupled between an inverting input of the operational amplifier and a first end of the first switch; wherein a non-inverting input of the operational amplifier may be coupled to the output node of the pixel and to a second end of the first switch; wherein the first switch is closed during the first readout phase and is open during the second readout phase.

The sample and buffer circuit may include a first switch, an operational amplifier and a capacitor; wherein the capacitor may be coupled between an inverting input of the operational amplifier and a first end of the first switch; wherein a non-inverting input of the operational amplifier may be coupled to the output node of the pixel and to a second end of the first switch; wherein the first switch is closed during the first readout phase and is open during the second readout phase.

The current memory may be configured to output the sampled second output current to a digital region of the readout circuit during a next first readout phase that followed the second readout phase.

During the first readout phase of the pixel and the second readout phase of the pixel the drain source voltage of the output transistor is smaller than a difference between a gate drain voltage (Vgs) of the output transistor and a threshold voltage Vth of the output transistor.

The a gate of the output transistor may be coupled to a floating diffusion node of the pixel; wherein between the first readout phase and the second readout phase, the pixel may be configured to transfer, to the floating diffusion node, charge that is responsive to the radiation sensed by the radiation sensor of the pixel during the sensing period.

The current source may be configured to drain, during the first readout phase of the pixel, a first fixed current and may be configured to drain, during the second readout phase of the pixel a second fixed current; wherein the second fixed current differs from the first fixed current.

The device may include set of pixels; wherein the readout circuit may be configured to perform a set of first readout phases for reading each pixel of the set of pixels and then to perform a set of second readout phases for reading each pixel of the set of pixels.

The readout circuit may include a set of sampling components for sampling, during the set of first readout phases, sampled output voltages of a set of output nodes of the set of pixels.

The current source may be coupled between a voltage supply and a select transistor of the pixel.

The output transistor may be coupled between the ground and the select transistor of the pixel.

The output transistor may be coupled between a voltage supply of less than 0.5 volts and the select transistor of the pixel.

The readout circuit may include a sample and buffer circuit and a current sampling circuit that may be configured to sample, during the second readout phase, a difference between the second output current and fixed supplied by the current source, wherein during a next first readout phase the current sampling circuit may be configured to output a signal that is responsive difference (the difference between the second output current and fixed supplied by the current source that was sampled during the second readout phase).

According to an embodiment of the invention there may be provided a device that may include a pixel, a current source, a sample and buffer circuit and a current memory circuit; wherein during a first readout phase the current source may be configured to drain a first fixed current from an output node of the pixel, wherein the sample and buffer circuit may be configured to sample a voltage of the output node of the pixel to provide a sampled voltage, and the current source is disconnected from the sample and buffer circuit and from the output node of the pixel; wherein the pixel may be configured to transfer, between the first readout phase and a second readout phase, toward an output transistor of the pixel, a charge that is indicative of radiation sensed by the a sensing element of the pixel; wherein the output transistor of the pixel may be coupled to the output node of the pixel; wherein during a second readout phase the pixel may be configured to provide to the output node a pixel current that is responsive to the charge, the current source may be configured to drain a second fixed current from the output node of the pixel, the sample and buffer circuit may be configured to provide to the output node of the pixel the sampled voltage, and the current memory may be configured to provide, via a feedback path, a feedback current to the output node of the pixel and to store a current memory voltage that once provided to an output transistor of the current memory causes the current memory to output the feedback current; wherein the feedback current substantially equals a difference between the second fixed current and the pixel current; and wherein during a third readout phase the current memory may be configured to output the feedback current to a digital to analog converter.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
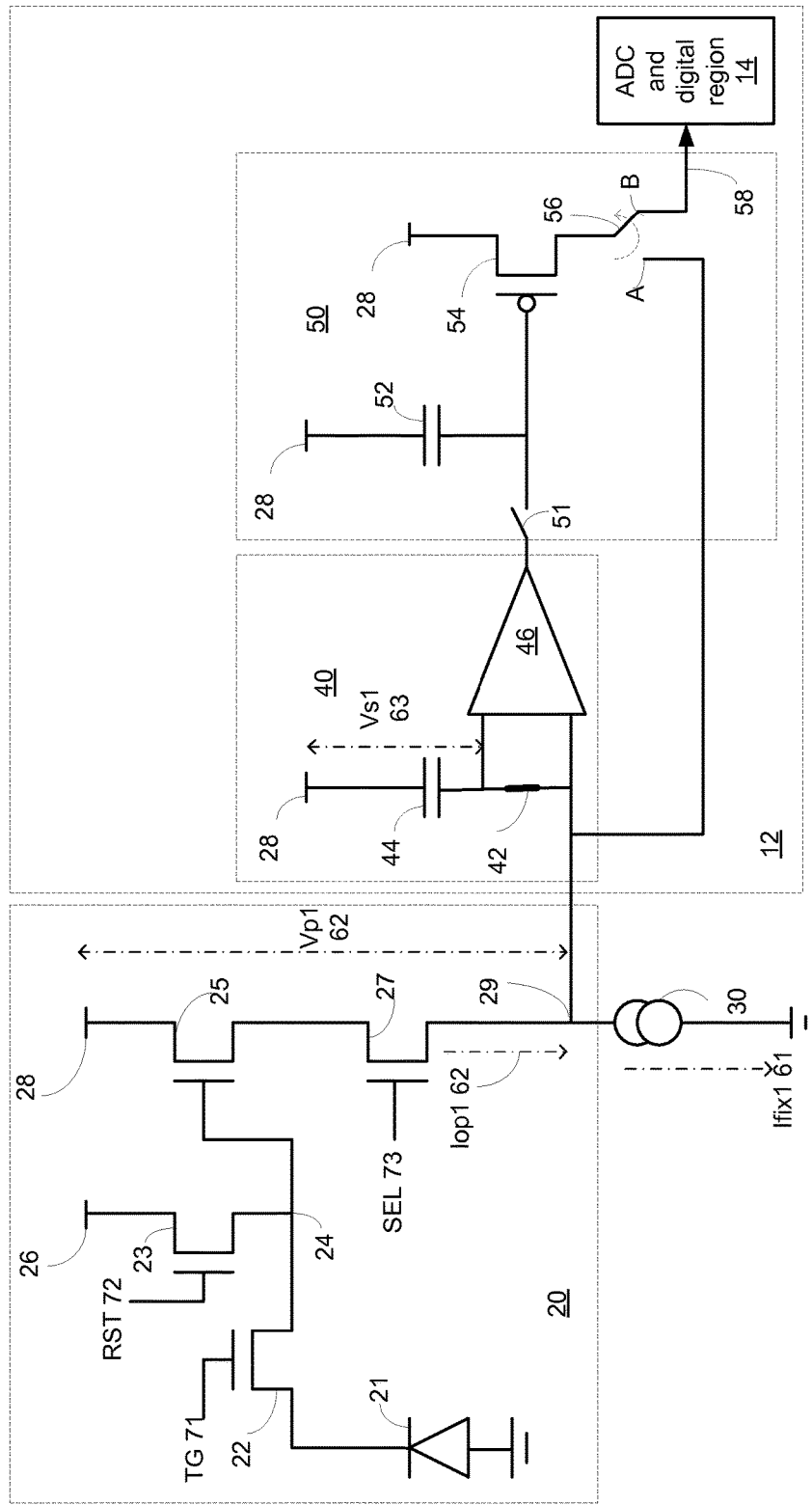
FIG. 1 illustrates a device that includes a pixel and readout circuit according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

According to various embodiment of the invention there is provided a device that includes a current source, a readout circuit and a pixel. The readout circuit is configured to sample during a first readout phase an output voltage of the pixel while the output current of the pixel is set by the current source. During a second readout phase the readout circuit is configured to provide the sampled voltage (or a close approximation) to the pixel and sample an output current that represents radiation sensed by the pixel. This sampling as well as maintaining an output transistor of the pixel as certain bias causes the transconductance of the pixel to be essentially constant and mostly independent of pixel transistor parameters variations.

Any type of sampling may be applied during the first readout phase and the second readout phase. For example any sampling step that may mitigate noises such as thermal noise, supply noise, clock jitter or any other noises may be applied. The sampling may mitigate also different sources of sampling errors, such charge injection in switches, control signals feedthrough, or any other sources of static or dynamic errors.

The device may be a sensor, a camera, a communication device, a computer, a monitor, a media player, and the like.

In the following figures there are provided non-limiting examples of sample and buffer circuits and current memory.

Figure 2:
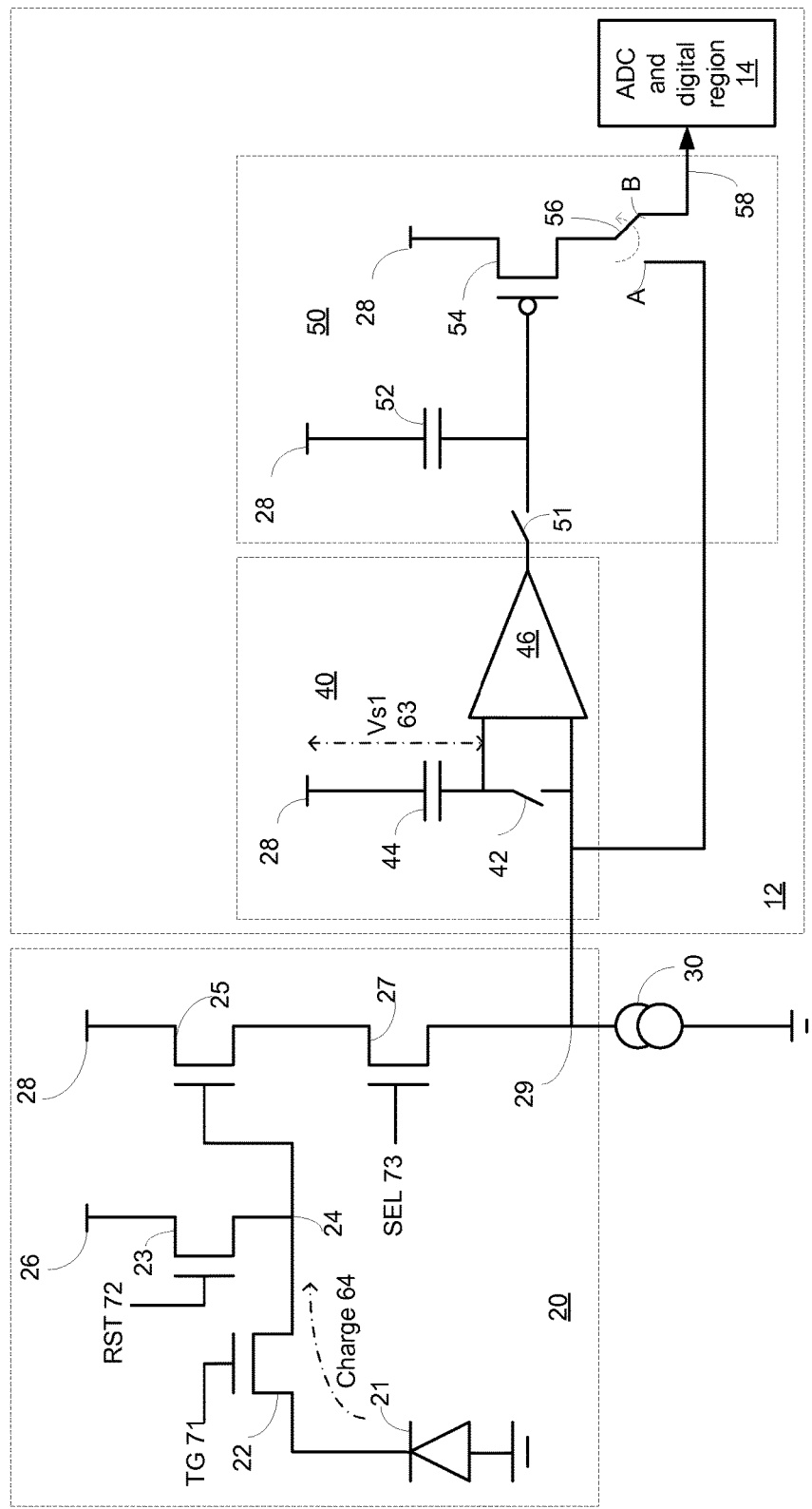
FIG. 2 illustrates a device that includes a pixel and readout circuit according to an embodiment of the invention.
Figure 3:
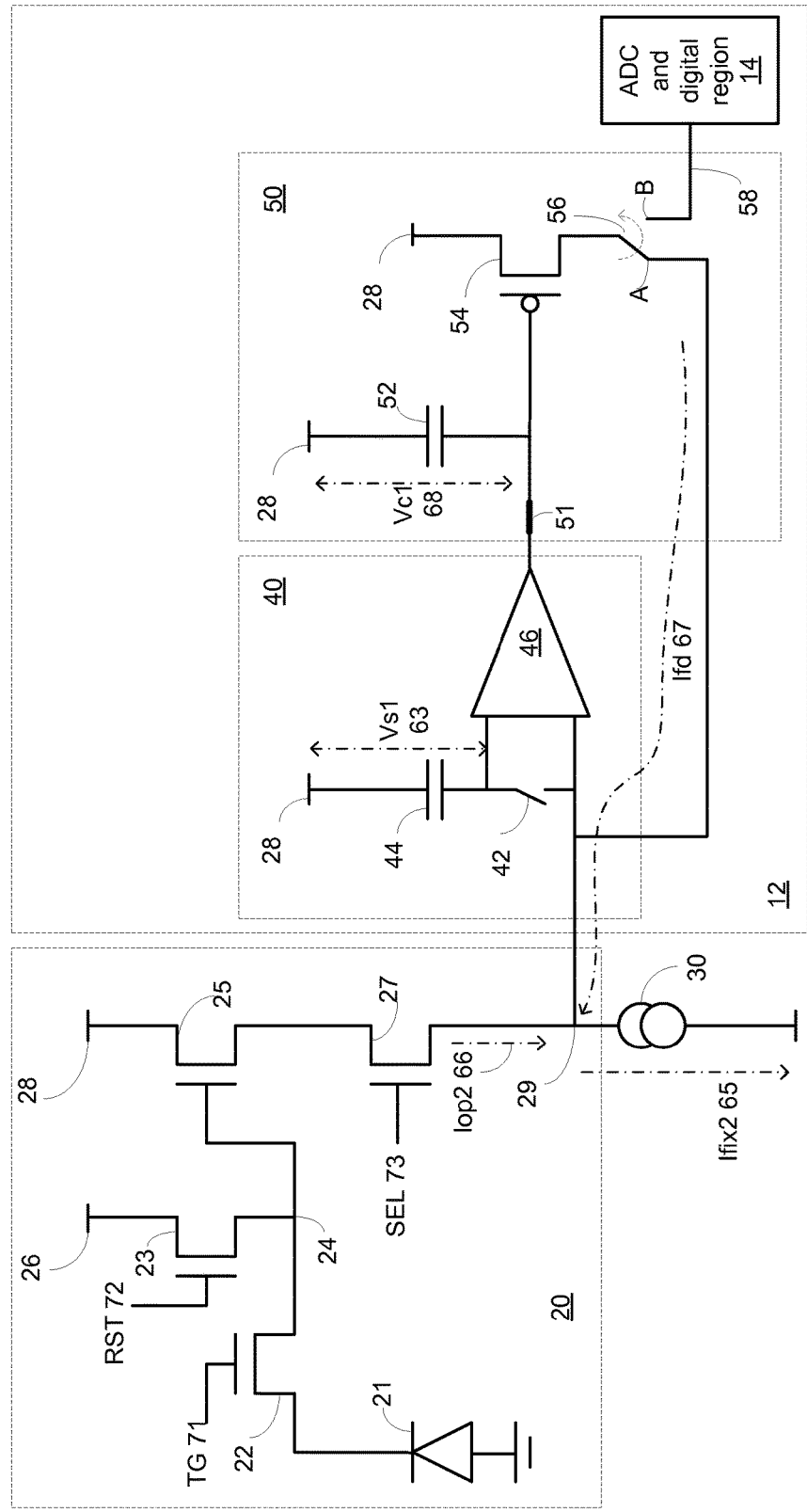
FIG. 3 illustrates a device that includes a pixel and readout circuit according to an embodiment of the invention.
Figure 4:
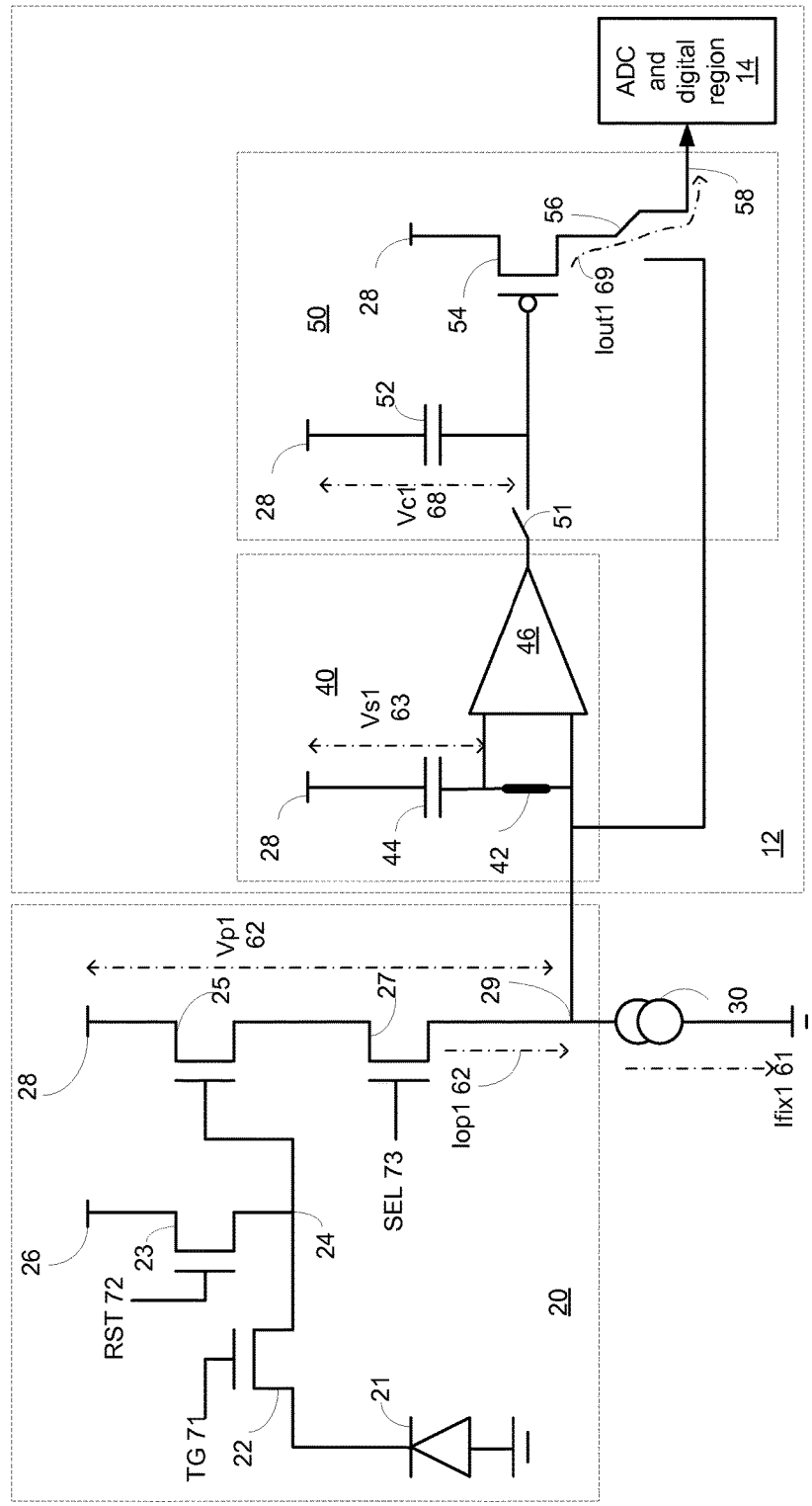
FIG. 4 illustrates a device that includes a pixel and readout circuit according to an embodiment of the invention.

FIG. 1 illustrates a device 10 that includes a pixel 20, current source 30 and readout circuit 12 during a first readout phase according to an embodiment of the invention. FIG. 2 illustrates device 10 during a period between the first readout phase and a second readout phase according to an embodiment of the invention. FIG. 3 illustrates device 10 during the second readout phase according to an embodiment of the invention. FIG. 4 illustrates device 10 during a next readout phase according to an embodiment of the invention.

Device 10 may include any type of pixel. Pixel 20 is a non-limiting example of a pixel. It is termed a 4T pixel as it includes four transistors. Pixel 20 may include three transistors or have more than four transistors.

Pixel 20 includes a photodiode 21, a transfer gate transistor 22, a reset transistor 23 a select transistor 27 and an output transistor 25. The gate of transfer gate transistor 22 is fed by transfer gate control signal TG 71. The gate of reset transistor 23 is fed by reset signal RST 72, the gate of select transistor 27 is fed by select signal SEL 73 and the gate of output transistor 25 is coupled to a floating diffusion node 24 of pixel 20.

The source of select transistor 27 is coupled to the output node 29 of pixel 20.

Readout circuit 12 includes sample and buffer circuit 40, current memory 50 and may or may not include analog to digital conversion (ADC) and digital region 14.

Sample and buffer circuit 40 includes capacitor 44 and operational amplifier 46. First switch 42 is connected between the inverting and non-inverting inputs of operational amplifier 46. Second switch 51 is illustrated as being included in current memory 50 and is used to connect or disconnect current memory 50 from sample and buffer circuit 40.

Current memory 50 includes capacitor 52 and output transistor 54. The drain of output transistor 54 is coupled a SPDT switching unit that include switch 56 that has a single input and two outputs A and B.

The drain of reset transistor 23 is coupled to first voltage source 26. The source of output transistor 54 and the drain of output transistor 25 are coupled to a second voltage source 28. The second voltage source 28 may supply a voltage that is lower than the voltage of first voltage supply 26. Thus, output transistor 25 may be maintained in its linear region and far away from its saturation region.—. In another embodiment of the invention, voltage sources 26 and 28 can be implemented as one source whose voltage just changes between reset and read operation. This avoids the need to bring separate metal lines for the above mentioned voltages to the pixel.

For example, first voltage source 28 may supply between 2.7 volts to 5 volts while second voltage source 28 may supply about 0.95 volts.

During a first readout phase of pixel 20, the readout circuit 12 is configured to sample a sampled output voltage Vp1 62 of output node 29. Capacitor 44 of sample and buffer circuit 40 samples Vs1 63=Vp1 62.

Switch 56 is at its B position.

During the first readout phase output node 29 is disconnected from the current memory 50 and the current that flows through output node 29 equals the current Ifix1 61 drained by current source 30. Ifix 61 sets the current (source drain current) outputted by output transistor 25.

FIG. 2 illustrates the transfer of charge 64 between photodiode 21 and floating diffusion node 24. The transfer occurs between the first readout phase of the pixel and a second readout phase of pixel 20. The charge 64 affects the conductivity of output transistor 25 and output transistor 25 outputs a current that differs from Ifix1 61 and reflects charge 64. Usually, charge 64 reduces the conductivity of output transistor 25 thereby reducing the source drain current outputted by output transistor 25.

As indicated above, between the first and second readout phases pixel 20 is configured to change the output current (outputted by output transistor 25) to provide a second output current. The change of the output current is responsive to radiation sensed by a radiation sensor of the pixel during a sensing period.

FIG. 3 illustrates that during the second readout phase of the pixel, first switch 42 is disconnected, second switch 51 connects current memory 50 to sample and buffer circuit 40. Switch 56 is at position A thereby closing a feedback loop to output node 29.

Capacitor 44 stores Vs1 63 (sampled during the first readout phase).

Due to charge 64 the output current from pixel 20 Iop 66 is smaller than the current Ifix2 65 drained by current source 30. Current memory 50 supplies to the output node 29, via the feedback loop, feedback current Ifd 67 that equals the difference between the second output current Iop2 66 and Ifix2 65. Capacitor 52 stores the voltage that once applied to the gate of output transistor 54 causes the output transistor to output Ifd 67.

Ifix1 may equal Ifix2. Alternatively, Ifix2 may be larger than Ifix1 in order to allow a flow of a feedback current event when charge 64 is zero—thereby providing a bias to the feedback loop and allowing a convergence of the feedback loop.

During the second readout phase capacitor 44 feeds operational amplifier 46 with a voltage sampled during the first readout phase.

FIG. 4 illustrates that during the next first readout phase the current memory 50 outputs to ADC and digital region 14 an output current Iout1 69 that equals Ifd 67. During the next first readout phase the sample and buffer circuit may sample the voltage of output node 29. The output current Iout1 represents charge 64 that in turn represents the radiation sensed by pixel 20.

According to an embodiment of the invention each set of pixels may be selectively coupled to a readout circuit. The readout circuit may operate in a pipelined manner during which the readout circuit performs a set of first readout phases (for different pixels) that is followed by a set of second readout phases (for different pixels).

This pipelined operation allows increasing the time between the first and second readout phase of each pixel and this may be useful when the transfer of charge from the photodiode to the floating transfer node is longer than the duration of the first and/or second readout phases.

In the readout circuit one or more pixels may share (or not share) a current source while each pixels is associated with a separate sample and buffer circuit and a separate current memory.

Figure 5:
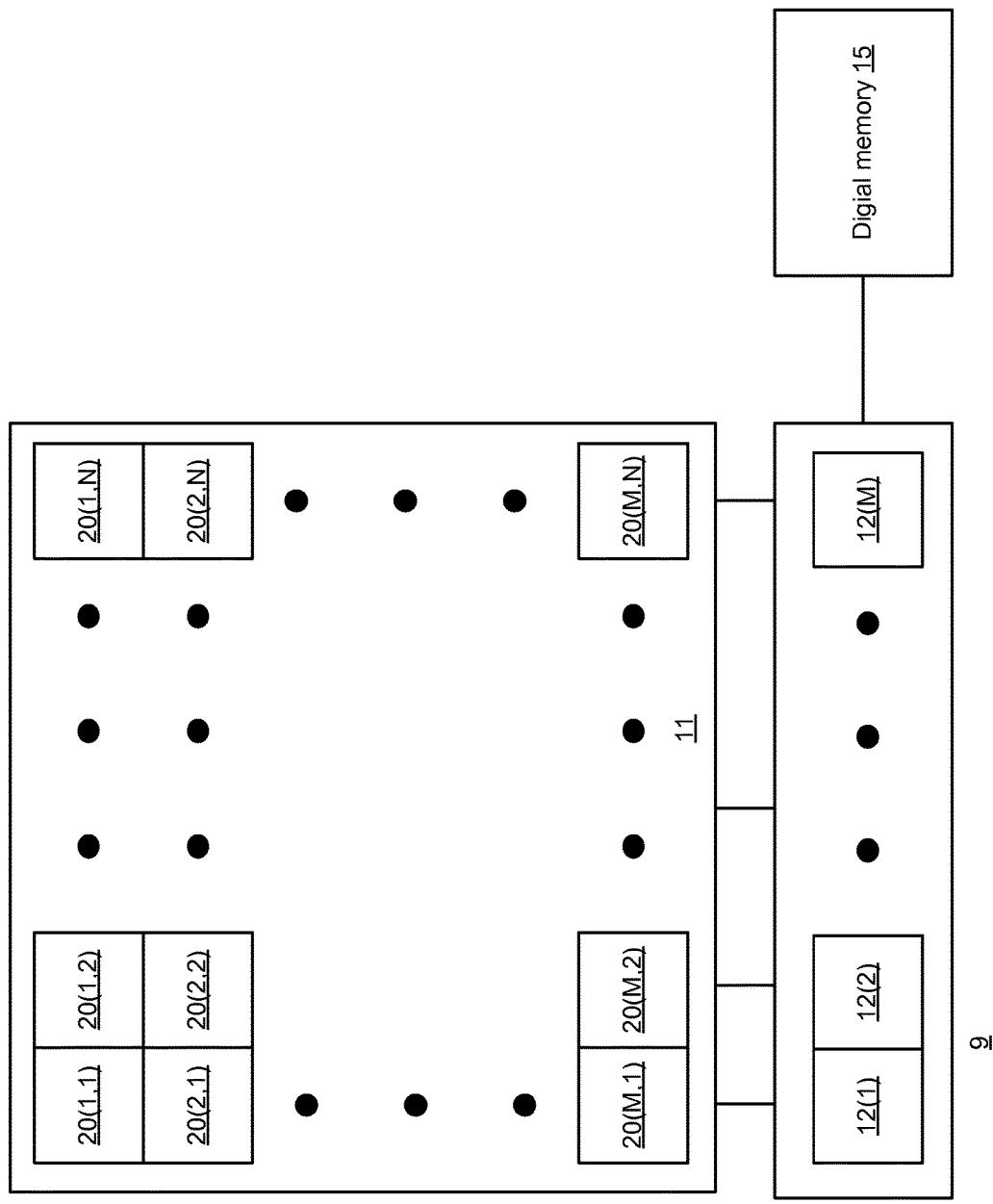
FIG. 5 illustrates a device that includes an array of pixels and an array of readout circuits according to an embodiment of the invention.

FIG. 5 illustrates a two dimensional array 11 of pixels 20(1,1)-20(M,N), an array of readout circuits 12(1)-12(M)—one per column of two dimensional array 11 and digital memory 15.

Figure 6:
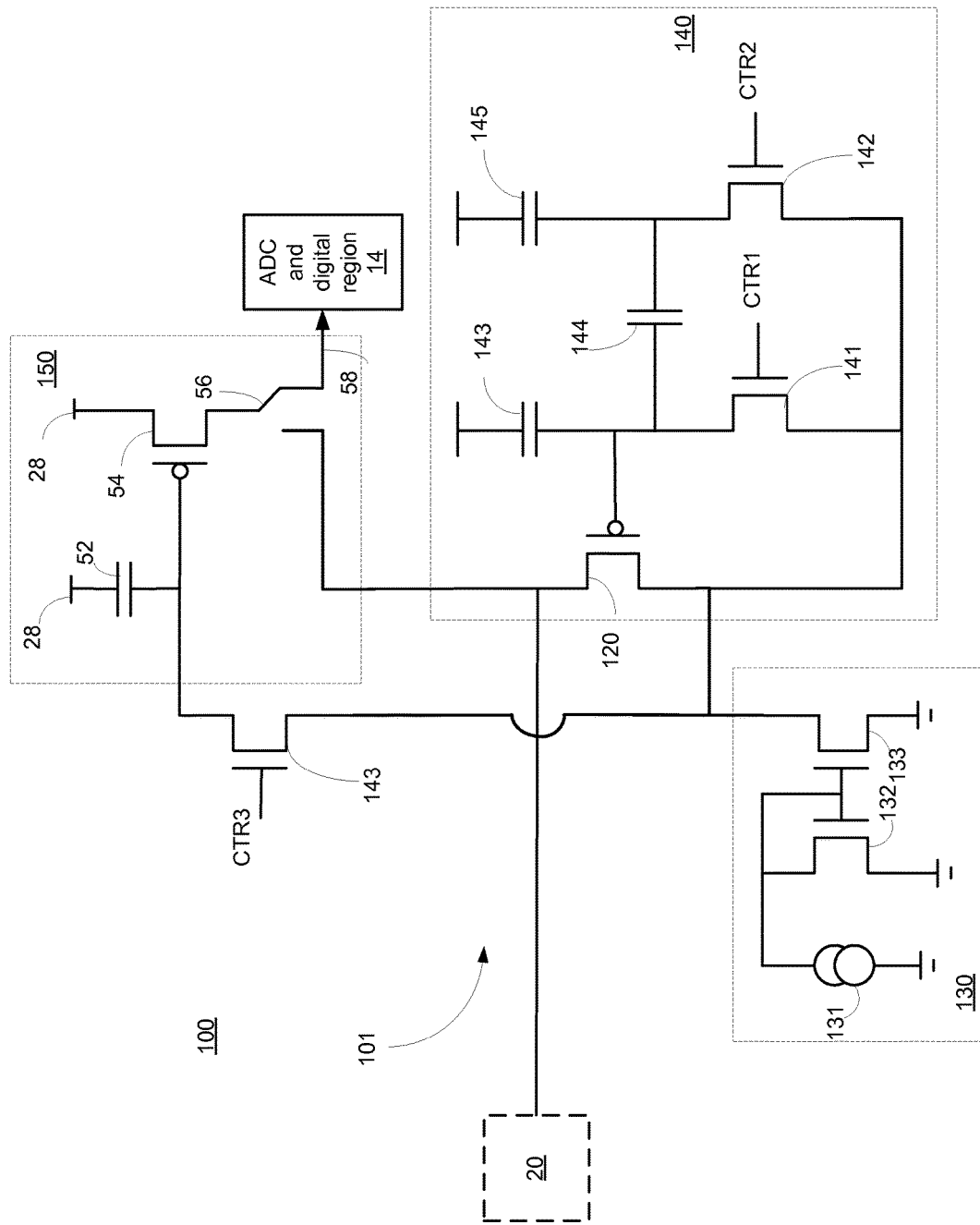
FIG. 6 illustrates a device that includes a pixel and readout circuit according to an embodiment of the invention.

FIG. 6 illustrates pixel 20, current source 130 and a readout circuit 101 according to an embodiment of the invention.

Current source 130 includes current source 131 and a current mirror that is formed from transistors 132 and 133. Any type of current source capable of providing a fixed current may be provided.

The sample and buffer circuit 140 is built around amplifier 120 that includes a single transistor.

Sample and buffer circuit 140 includes first switch 141, second switch 142, first capacitor 143, second capacitor 145 and intermediate capacitor 144.

First switch 141 is fed by control signals CTR1, second switch 142 is fed by control signals CTR2. A third switch 143 is fed by control signals CTR3 and performs a similar function to switch 51.

Intermediate capacitor 144 provides a weak coupling between first capacitor 143 and second capacitor 145. The two phase sampling performed by switches 141 and 142 reduces the noise contribution of the sampling.

A similar sampling noise reducing process can be applied during the second readout phase.

During the first readout phase the following sub-phases may be executed:
a) First switch 141 and second switch 142 are closed to sample the output voltage of pixel 20.
b) First switch 141 is opened thereby introducing a voltage error that changes the voltage of first capacitor 143. Second switch 142 is still closed thus closing a feedback loop with amplifier 120, and intermediate capacitor 144. This feedback loop compensates for the voltage error.
c) Second switch 142 is opened thereby introducing a much smaller voltage error in the voltage of first capacitor 143—due to the weak coupling (for example a 1:10 coupling) introduced by intermediate capacitor 144.

Variants of this sampling noise reduction technique that employ more than two sub-phases and use capacitor-switch ladders with mire steps in order to achieve further reduction in noise contribution are possible.

Figure 8:
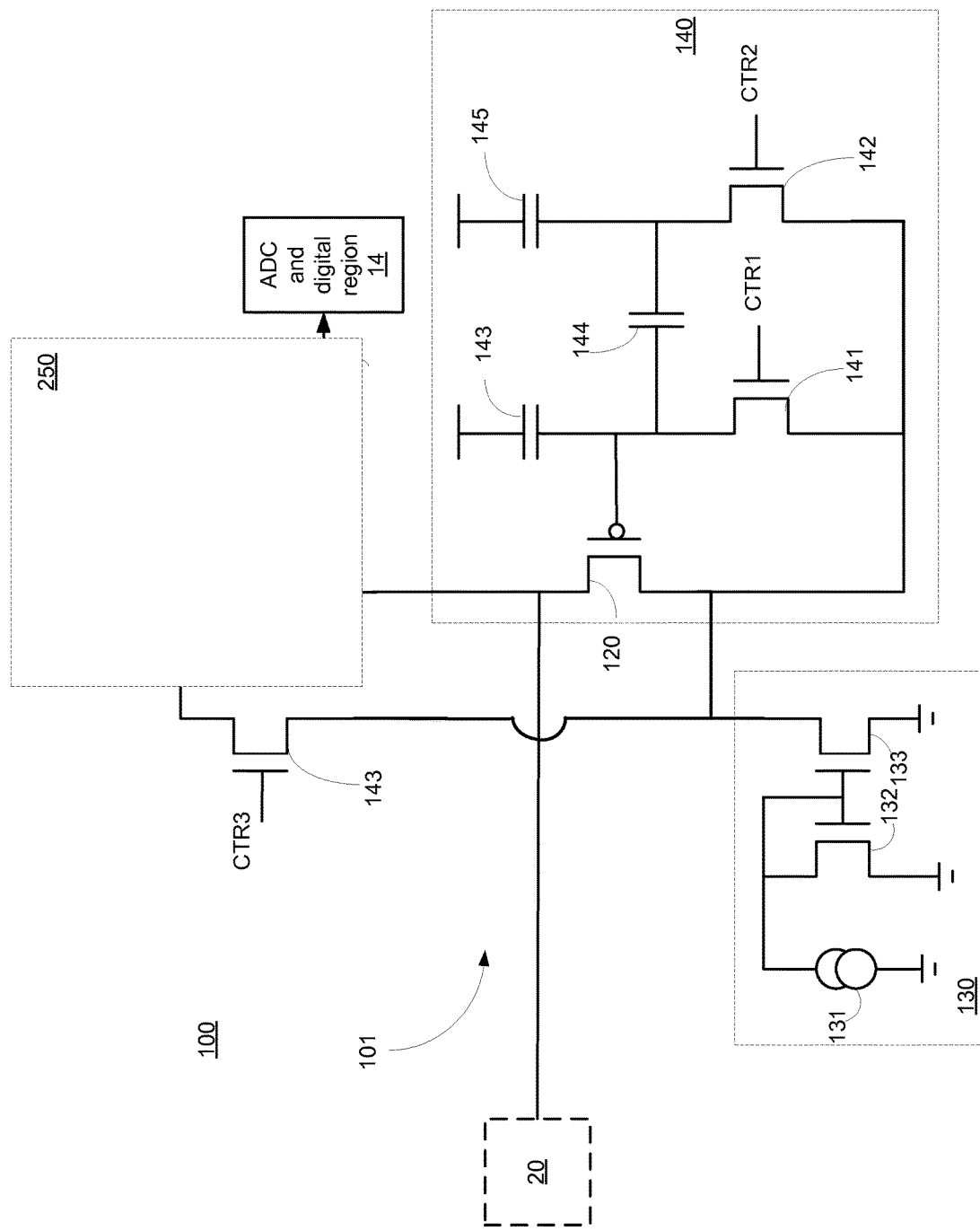
FIG. 8 illustrates a device that includes a pixel and readout circuit according to an embodiment of the invention.

Current memory circuit 50 (150) may be substituted by any other type of current sampling circuit (such as sampling circuit 250 of FIG. 8) that may be an integrator circuit, the current sampling circuit 250 may be configured to, during the second readout phase, integrate the current Idf 67 and during the next first readout phase output a signal that represents this current integral.

Figure 7:
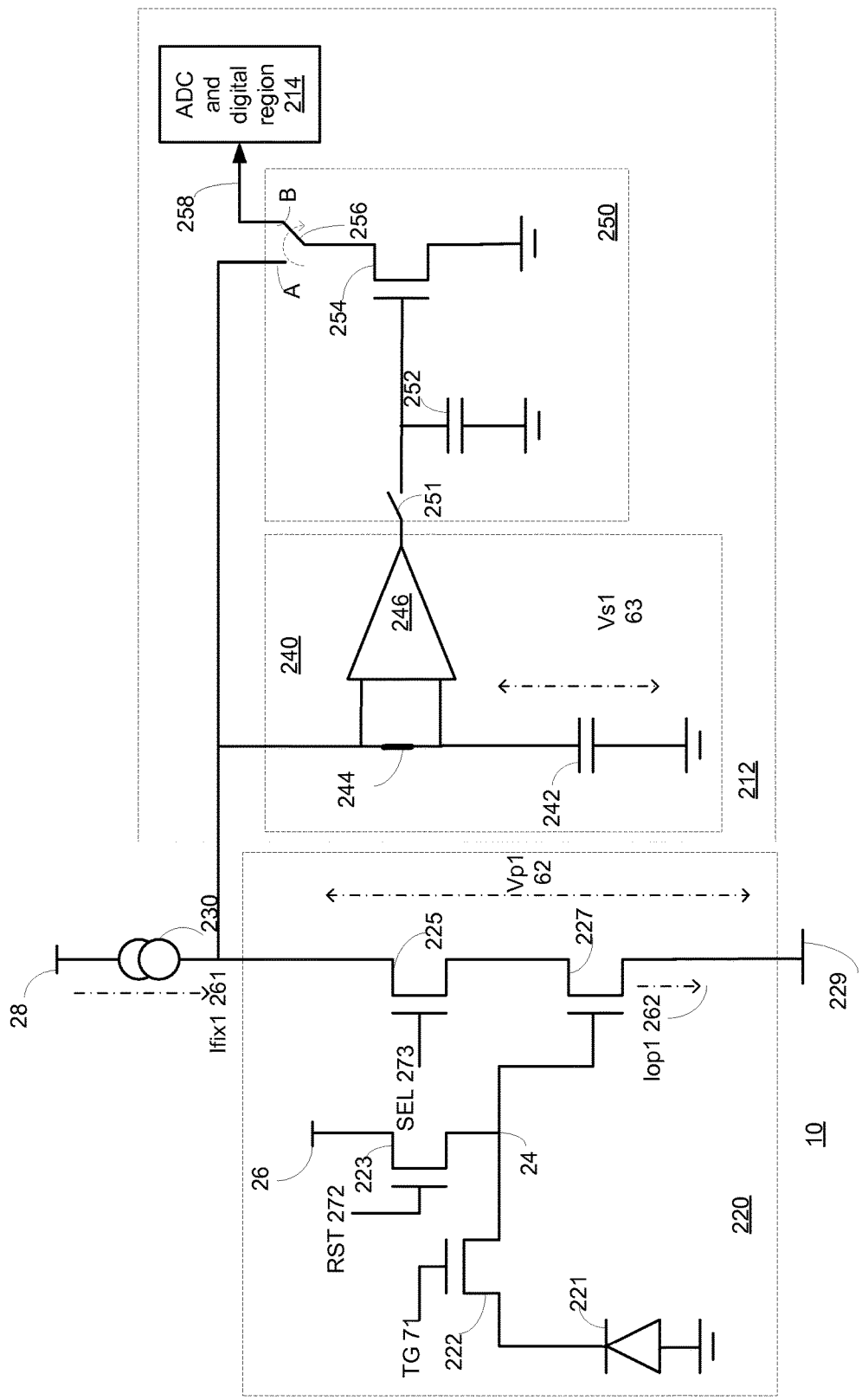
FIG. 7 illustrates a device that includes a pixel and readout circuit according to an embodiment of the invention.

FIG. 7 illustrates pixel 220, current source 230 and readout circuit 212 according to an embodiment of the invention.

Pixel 220 is an example of a variant of a 4T pixel in which the source of output transistor 227 is connected to voltage 229 that is a voltage close to but higher than the ground. The source of select transistor 225 is connected to the drain of output transistor 227. The drain of select transistor 225 is connected to the output conductor 229. Current flow direction in the output section of pixel 220 is reversed relative to the current direction in pixel 20, thus permitting use of higher currents and thus achieving faster readout times.

Readout circuit 212 comprises of sample and buffer circuit 240, current memory circuit 250 and may or may not include ADC and digital region 214. Current flow direction in circuits 240 and 250 is reversed relative to current flow direction in circuits 40 and 50 in order to match current flow direction in pixel 220.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same common mode noise choke. Alternatively, the examples may be implemented as any number of separate integrated circuits or separate common mode noise chokes interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

Any reference to the term "comprising" or "having" should be interpreted also as referring to "consisting" of "essentially consisting of". For example—a device that comprises certain components can include additional components, can be limited to the certain components or may include additional components that do not materially affect the basic and novel characteristics of the device—respectively.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A device comprising a pixel, a current source, and a readout circuit;
    wherein during a first readout phase of the pixel, the readout circuit is configured to sample a sampled output voltage of an output node of the pixel; and wherein an output current of the pixel is set by the current source;
    wherein between the first readout phase of the pixel and a second readout phase of the pixel, the pixel is configured to change the output current to provide a second output current, wherein the change of the output current is responsive to radiation sensed by a radiation sensor of the pixel during a sensing period;
    wherein during the second readout phase of the pixel the readout circuit is configured to sample the second output current while providing the sampled output voltage to the output node of the pixel;
    wherein during the first readout phase of the pixel and the second readout phase of the pixel a drain source voltage of an output transistor of the pixel is maintained constant; and
    wherein the output transistor is configured to generate the second output current.

2. The device according to claim 1 wherein the readout circuit comprises a sample and buffer circuit and a current memory; wherein during the first readout phase the current memory is disconnected from the sample and buffer circuit and from the pixel.

3. The device according to claim 2 wherein during the second readout phase the current memory is configured to provide to the output node of the pixel a feedback current that equals a difference between the second output current and a fixed current drained from the output node of the pixel by the current source.

4. The device according to claim 3 wherein the current memory comprises a sampling unit and an output transistor; wherein the sampling component is configured to sample, during the second readout phase, a sampled gate voltage of the output transistor; wherein the feedback current is provided to the output node of the pixel via a feedback loop; and wherein the sampling unit is configured to provide to the gate of the output transistor the sampled gate voltage after the current memory is disconnected from the pixel.

5. The device according to claim 2 wherein the current memory comprises a current memory input switch, a feedback switch and a current memory output switch; wherein during the first readout phase the current memory input switch and the current memory output switch are closed and the feedback switch is open; wherein during the second readout phase the current memory input switch and the current memory output switch are open and the feedback switch is closed.

6. The device according to claim 5 wherein the sample and buffer circuit comprises a first switch, an operational amplifier and a capacitor; wherein the capacitor is coupled between an inverting input of the operational amplifier and a first end of the first switch; wherein a non-inverting input of the operational amplifier is coupled to the output node of the pixel and to a second end of the first switch; wherein the first switch is closed during the first readout phase and is open during the second readout phase.

7. The device according to claim 2 wherein the sample and buffer circuit comprises a first switch, an operational amplifier and a capacitor; wherein the capacitor is coupled between an inverting input of the operational amplifier and a first end of the first switch; wherein a non-inverting input of the operational amplifier is coupled to the output node of the pixel and to a second end of the first switch; wherein the first switch is closed during the first readout phase and is open during the second readout phase.

8. The device according to claim 2 wherein the current memory is configured to output the sampled second output current to a digital region of the readout circuit during a next first readout phase that followed the second readout phase.

9. The device according to claim 1 wherein during the first readout phase of the pixel and the second readout phase of the pixel the drain source voltage of the output transistor is smaller than a difference between a gate drain voltage (Vgs) of the output transistor and a threshold voltage Vth of the output transistor.

10. The device according to claim 1 wherein a gate of the output transistor is coupled to a floating diffusion node of the pixel; wherein between the first readout phase and the second readout phase, the pixel is configured to transfer, to the floating diffusion node, charge that is responsive to the radiation sensed by the radiation sensor of the pixel during the sensing period.

11. The device according to claim 1 wherein the current source is configured to drain, during the first readout phase of the pixel, a first fixed current and is configured to drain, during the second readout phase of the pixel a second fixed current; wherein the second fixed current differs from the first fixed current.

12. The device according to claim 1 comprises set of pixels; wherein the readout circuit is configured to perform a set of first readout phases for reading each pixel of the set of pixels and then to perform a set of second readout phases for reading each pixel of the set of pixels.

13. The device according to claim 12 wherein the readout circuit comprise a set of sampling components for sampling, during the set of first readout phases, sampled output voltages of a set of output nodes of the set of pixels.

14. The device according to claim 1 wherein the current source is coupled between a voltage supply and a select transistor of the pixel.

15. The device according to claim 1 wherein the output transistor is coupled between the ground and the select transistor of the pixel.

16. The device according to claim 1 wherein the output transistor is coupled between a voltage supply of less than 0.5 volts and the select transistor of the pixel.

17. The device according to claim 1 wherein the readout circuit comprises a sample and buffer circuit and a current sampling circuit that is configured to sample, during the second readout phase, a difference between the second output current and fixed supplied by the current source, wherein during a next first readout phase the current sampling circuit is configured to output a signal that is responsive difference.

18. A device comprising a pixel, a current source, a sample and buffer circuit and a current memory circuit;
    wherein during a first readout phase the current source is configured to drain a first fixed current from an output node of the pixel, wherein the sample and buffer circuit is configured to sample a voltage of the output node of the pixel to provide a sampled voltage, and the current source is disconnected from the sample and buffer circuit and from the output node of the pixel;

wherein the pixel is configured to transfer, between the first readout phase and a second readout phase, toward an output transistor of the pixel, a charge that is indicative of radiation sensed by the sensing element of the pixel; wherein the output transistor of the pixel is coupled to the output node of the pixel;

wherein during a second readout phase the pixel is configured to provide to the output node a pixel current that is responsive to the charge, the current source is configured to drain a second fixed current from the output node of the pixel, the sample and buffer circuit is configured to provide to the output node of the pixel the sampled voltage, and the current memory circuit is configured to provide, via a feedback path, a feedback current to the output node of the pixel and to store a current memory voltage that once provided to an output transistor of the current memory circuit causes the current memory to output the feedback current; wherein the feedback current substantially equals a difference between the second fixed current and the pixel current;

wherein during a third readout phase the current memory circuit is configured to output the feedback current to a digital to analog converter.

* * * * *